United States Patent
Pei et al.

(10) Patent No.: US 10,497,128 B2
(45) Date of Patent: Dec. 3, 2019

(54) METHOD AND SYSTEM FOR SEA BACKGROUND MODELING AND SUPPRESSION ON HIGH-RESOLUTION REMOTE SENSING SEA IMAGES

(71) Applicant: SHENZHEN UNIVERSITY, Shenzhen, Guangdong (CN)

(72) Inventors: Jihong Pei, Guangdong (CN); Lixia Wang, Guangdong (CN); Weixin Xie, Guangdong (CN); Xuan Yang, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 225 days.

(21) Appl. No.: 15/857,551

(22) Filed: Dec. 28, 2017

(65) Prior Publication Data
US 2018/0144478 A1 May 24, 2018

Related U.S. Application Data

(63) Continuation of application No. PCT/CN2016/087716, filed on Jun. 29, 2016.

(51) Int. Cl.
*G06K 9/34* (2006.01)
*G06T 7/194* (2017.01)
*G06T 7/143* (2017.01)
*G06T 7/11* (2017.01)
*G06T 7/168* (2017.01)
(Continued)

(52) U.S. Cl.
CPC ............ *G06T 7/194* (2017.01); *G06K 9/6267* (2013.01); *G06T 5/20* (2013.01); *G06T 7/11* (2017.01); *G06T 7/143* (2017.01); *G06T 7/168* (2017.01); *G06T 2207/10032* (2013.01); *G06T 2207/20021* (2013.01); *G06T 2207/20056* (2013.01); *G06T 2207/20076* (2013.01)

(58) Field of Classification Search
CPC . G06T 2207/20076; G06T 2207/20056; G06T 2207/20021; G06T 2207/10032; G06T 2207/30236; G06T 2207/30181; G06T 7/194; G06T 7/168; G06T 7/11; G06T 7/143; G06T 5/20; G06K 9/6267; G06K 9/522; G06K 9/0063
See application file for complete search history.

(56) References Cited

U.S. PATENT DOCUMENTS

2003/0088825 A1* 5/2003 Chakraborty ...... G06K 9/00456
715/247

FOREIGN PATENT DOCUMENTS

CN 103971370 * 8/2014 ............... G06T 7/00

OTHER PUBLICATIONS (Multiresolution Based Gaussian Mixture Model for Background Suppression, IEEE Transactions on Image Processing, vol. 22, No. 12, Dec. 2013, pp. 5022-5032 (Year: 2013).*

* cited by examiner

*Primary Examiner* — Amara Abdi

(57) ABSTRACT

The disclosure provides a method for sea background modeling and suppression on high-resolution remote sensing sea images, the method comprises steps of segmentation, classification, calculation, modeling and suppression. The disclosure also provides a system for sea background modeling and suppression on high-resolution remote sensing sea images. The technical solution of the disclosure is provided in such way as to perform sea background suppression first and then detect the target, leading to large improvement of detection accuracy and reduction of false alarm.

6 Claims, 4 Drawing Sheets

(51) Int. Cl.
*G06K 9/62* (2006.01)
*G06T 5/20* (2006.01)

METHOD AND SYSTEM FOR SEA BACKGROUND MODELING AND SUPPRESSION ON HIGH-RESOLUTION REMOTE SENSING SEA IMAGES

CROSS-REFERENCE TO RELATED APPLICATIONS

The present application is a Continuation Application of PCT application No. PCT/CN2016/087716 filed on Jun. 29, 2016, the entire contents of which are hereby incorporated by reference.

TECHNICAL FIELD

The present disclosure relates to the field of image processing, and more particularly to methods and systems for sea background modeling and suppression on high-resolution remote sensing sea images.

BACKGROUND OF THE DISCLOSURE

In optical satellite remote sensing sea images, not only the target or object information is contained, but also the seawater background information of the sea surface around the target. The appearance of seawater background in the image may be varied as, for example, storms, surges, waves, vortexes, bubbles, etc. due to various natural factors such as wind strength, wind direction, waves, and ambient humidity or the like on the sea surface. In order to effectively detect the targets in a remote sensing sea image, it is a good way to model and suppress the seawater background.

Currently, there are some major methods for seawater background modeling and suppression of optical satellite remote sensing sea images in the prior. The methods are as follows:

I. Mathematical Morphology-based method. The method uses structural basic-elements to probe spatial repetitiveness domain with similar features, i.e. regions of seawater background, and removes them from the image, so as to extract the target region. When using the Mathematical Morphology method for detection, the result is relevant to the selection of structural basic-elements. However, it has always been crucial and also difficult to select a better structural basic-element.

II. Image Spatial Grayscale Statistics Distribution Model-based method. The method first selects a probability model (such as Gaussian Model, K-Distribution Model, etc.) that best describes the space grayscale statistics distribution feature of sea background of the remote sensing sea image, and then estimates parameters of the distribution model according to the spatial grayscale of sea background, and at the end determines the model probability of gray level of respective pixel in the sea remote sensing image which contains targets by using the spatial grayscale statistics distribution model of seawater background, thereby segments the vessel target regions from the image. In the case of sea background with relative tranquility, the sea clutter may be fitted by selecting a suitable distribution model. However, for an image with complex background clutter, the distribution model is often not well defined, resulting in the bad accuracy of segmentation of target regions.

III. Fractal Model-based method. The method first uses the fractal theory and technique to carry out the multi-scale fractal dimension decomposition of an image, and then segments the sea background region and the target region according to their difference in fractal dimension, thereby detects and extracts the target regions. However, the actual image is prone to be affected by, for example, background complexity, random noise, image quality, etc., it would be difficult to distinguish between the sea background and the target area by only a single scale or constant fractal dimension.

IV. Visual Saliency Model-base method. The method first produces a visual saliency image through feature extraction, saliency calculation and saliency image fusion, and then probes the relatively salient visual objects in the produced saliency image and extracts the corresponding regions so as to complete the detection on the target region. The method introduces multiples of features, which can segment the target regions from the sea background in a better way. However, there is no reliable assessment method to select a proper feature because there are too many features to be selected.

All in all, the existed background model based on Image Spatial Grayscale Distribution has not been able to describe the background clutter of image when the sea background is complex and fit the sea background of the satellite remote sensing sea image well, resulting in high false alarm rate and low detection accuracy of the target detection method of the satellite remote sensing sea image based on Spatial Grayscale Distribution Model.

SUMMARY OF THE DISCLOSURE

Accordingly, the object of this present disclosure is to provide a method for sea background modeling and suppression of high-resolution remote sensing sea image and a system using the same, which intends to solve the aforementioned problems.

The present disclosure provides a method for sea background modeling and suppression on high-resolution remote sensing sea images, characterized in that the method comprises the step of:

segmentation: pre-processing and dividing a remote sensing image into a plurality of image blocks, and carrying out coarse classification for the plurality of image blocks to pick out a set of image blocks available for analyzing sea image;

classification: further classifying all of the image blocks within the set of image blocks available for analyzing sea image into two subsets including a subset of image blocks of clear seawater and a subset of image blocks of non-clear seawater;

calculation: converting each of the image blocks within the set of image blocks available for analyzing sea image, by 2D discrete Fourier transform, into a respective frequency spectrogram, and therefore calculating the frequency spectrogram to obtain a respective amplitude spectrogram;

modeling: determining one image block to be analyzed from the set of image blocks available for analyzing sea image; locating all the image blocks of clear seawater surrounding the image block to be analyzed from the subset of image blocks of clear seawater, as the image block to be analyzed being center; and constructing a graph of Gaussian probability model for the amplitude spectrogram of sea background based on the located image blocks of clear water;

suppression: constructing a suppression filter based on the graph of Gaussian probability model of the amplitude spectrogram, and performing sea background suppression on the image block to be analyzed.

Preferably, the method further comprises:

circulation: determining a next image block to be analyzed, and repeating the steps of modeling and suppression so as to perform sea background suppression on the new image block to be analyzed until all of the image blocks are done with sea background suppression.

Preferably, the step of suppression specifically comprises:

calculating a graph of Mahalanobis distance of the image block to be analyzed by using the graph of Gaussian probability model of amplitude spectrogram of sea background constructed in the step of modeling;

designing and obtaining the ideal sea background suppression filter for the image block to be analyzed based on the graph of Mahalanobis distance;

further designing the Gaussian sea background suppression filter based on the ideal sea background suppression filter;

filtering the image block to be analyzed in the frequency domain using the Gaussian sea background suppression filter, and obtaining the background-suppressed image block by converting the filtered frequency spectrogram using 2D Fourier inverse transform.

In another aspect, the present disclosure provides a system for sea background modeling and suppression of high-resolution remote sensing images, the system comprises:

a segmentation module, configured to pre-process and divide a remote sensing image into a plurality of image blocks, and carry out coarse classification for the plurality of image blocks to pick out a set of image blocks available for analyzing sea image;

a classification module, configured to further classify all of the image blocks within the set of image blocks available for analyzing sea image into two subsets including a subset of image blocks of clear seawater and a subset of image blocks of non-clear seawater;

a calculation module, configured to convert each of the image blocks within the set of image blocks available for analyzing sea image, by 2D discrete Fourier transform, into a respective frequency spectrogram, and therefore calculate the frequency spectrogram to obtain a respective amplitude spectrogram;

a modeling module, configured to determine one image block to be analyzed from the set of image blocks available for analyzing sea image; locate all the image blocks of clear seawater surrounding the image block to be analyzed from the subset of image blocks of clear seawater, as the image block to be analyzed being center; and construct a graph of Gaussian probability model for the amplitude spectrogram of sea background based on the located image blocks of clear water;

a suppression module, configured to construct a suppression filter based on the graph of Gaussian probability model of the amplitude spectrogram, and perform sea background suppression on the image block to be analyzed.

Preferably, the system further comprises:

a circulation module, configured to determine a next image block to be analyzed, and repeat the steps of modeling and suppression so as to perform sea background suppression on the new image block to be analyzed until all of the image blocks are done with sea background suppression.

Preferably, the suppression module is specifically configured to:

calculate a graph of Mahalanobis distance of the image block to be analyzed by using the graph of Gaussian probability model of amplitude spectrogram of sea background constructed in the step of modeling;

design and obtain the ideal sea background suppression filter for the image block to be analyzed based on the graph of Mahalanobis distance;

further design the Gaussian sea background suppression filter based on the ideal sea background suppression filter;

filter the image block to be analyzed in the frequency domain using the Gaussian sea background suppression filter, and obtain the background-suppressed image block by converting the filtered frequency spectrogram using 2D Fourier inverse transform.

The present disclosure provides a technical solution to solve the problem that the sea background model of satellite remote sensing sea image applied in the prior art cannot describe and suppress the sea background clutter in the image which resulting in the instability. The present disclosure uses the method to conduct suppression on the sea background first and then detect the target therein, leading to improvement of detection accuracy and reduction of false alarm.

DETAILED DESCRIPTION OF THE DISCLOSURE

For better understanding of the aforementioned objects, technical solution and advantages of the present disclosure, several preferred embodiments of the present disclosure will now be described with reference to the appended drawings. It is to be appreciated that those embodiments are to be considered exemplary only and non-limiting.

In order to solve the problem existed in the prior art, a method for sea background modeling and suppression of optical satellite high-resolution remote sensing sea images provided by the present disclosure focuses on: creating a frequency domain statistical model of partial sea background for the remote sensing sea image, and on this basis creating a background suppression filter to suppress the sea background. Specifically, the method comprises: segmentation, which pre-processes and divides a remote sensing image into a plurality of image blocks, and carries out coarse classification for the plurality of image blocks to pick out a set of image blocks available for analyzing sea image; classification, which further classifies all of the image blocks within the set of image blocks available for analyzing sea image into two subsets including a subset of image blocks of clear seawater and a subset of image blocks of non-clear seawater; calculation, which converts each of the image blocks within the set of image blocks available for analyzing sea image, by 2D discrete Fourier transform, into a respective frequency spectrogram, and therefore calculates the frequency spectrogram to obtain a respective amplitude spectrogram; modeling, which determines one image block to be analyzed from the set of image blocks available for analyzing sea image, locates all the image blocks of clear seawater surrounding the image block to be analyzed from the subset of image blocks of clear seawater, as the image block to be analyzed being center, and constructs a graph of Gaussian probability model for the amplitude spectrogram of sea background based on the located image blocks of clear water; suppression, which constructs a suppression filter based on the graph of Gaussian probability model of the amplitude spectrogram, and performs sea background suppression on the image block to be analyzed.

By way of conducting suppression on the sea background first and then detecting the target therein, the method for sea background modeling and suppression on high-resolution remote sensing sea images provided in the present disclosure may largely improve the detection accuracy and reduce the false alarm.

The method for sea background modeling and suppression on high-resolution remote sensing sea images provided in the present disclosure will now be further specified as follows.

Figure 1:
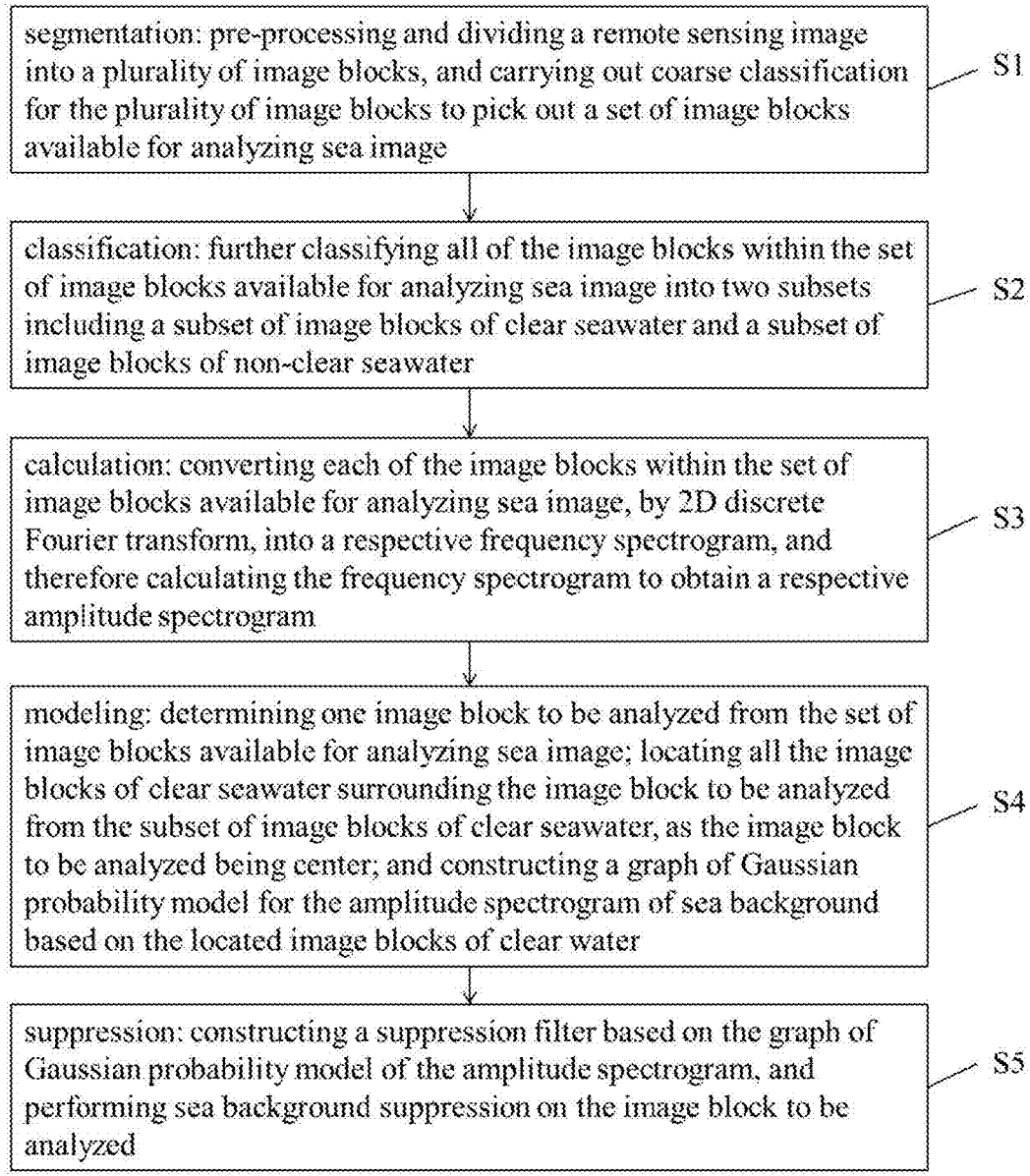
FIG. 1 is a flow diagram illustrating a method for sea background modeling and suppression of a high-resolution remote sensing sea image according to one embodiment of the present disclosure.

Referring to FIG. 1, which shows a flow diagram illustrating a method for sea background modeling and suppression of a high-resolution remote sensing sea image according to one embodiment of the present disclosure.

In S1, the step of segmentation, a remote sensing image is pre-processed and divided into a plurality of image blocks, and coarse classification for the plurality of image blocks are carried out, such that a set of image blocks available for analyzing sea image is selected.

In the present embodiment, pre-processing the remote sensing image by conducting sea-land segmentation, detecting a cloud-covered region and etc.; conducting the block-segmentation on the pre-processed remote sensing image; carrying out coarse classification for each image block, which is segmented from the remote sensing image, into a sea background-analyzable image block set Sa and a sea background-unanalyzable image block set Sn.

In the present embodiment, the sea-land segmentation conducted on the remote sensing image is defined as the process that partitions the land and island region from the remote sensing image to obtain the sea image, thereby the detection of sea target may simply performed in the sea region. In the present embodiment, the sea-land segmentation may be handled by the method of auto learning associated with the global coastline database. Furthermore, in the obtained sea remote sensing images, there are often some sea regions covered by thick cloud. Detection of sea target may not be conducted in those cloud-covered regions of the remote sensing images. There are however some known cloud detection algorithms which allow for detecting the cloud-covered regions within the remote sensing images. Accordingly, there is no necessary to further describe the methods of sea-land segmentation and cloud detection here. In the present embodiment, it's assumed that the land-island regions as well as the cloud-covered regions have been segmented from the remote sensing image by means of the sea-land segmentation and the cloud detection, such that the sea image has been obtained.

In the present embodiment, the format of the high-resolution remote sensing image generally has a relatively large size with a large-scale coverage, a large number of pixels and a large volume of data. Within such sea remote sensing image, the sea backgrounds may resemble one another in a partial region, and the similarity of background may be reduced between two far away regions. For creating an accurate sea background model to effectively suppress the background and the detecting target, it is necessary to handle the large scale-covered remote sensing image with block-segmentation. Conventionally, the suitable size of the blocks may be 256×256 or 512×512. The image may be evenly partitioned into multiple blocks with non-overlapping regions, or may be evenly partitioned into multiple blocks with overlapping regions. For facilitating the target detection, it may be preferred to partition the image in such a way that the horizontally neighboring blocks half-overlap one another and the vertically neighboring blocks half-overlap one another.

In the present embodiment, in a certain partitioned image, if the area of the land region and the cloud region is greater than a certain proportion r1 of the total area of the image, the image is referred to sea background-unanalyzable sea image. An image set formed of all the sea background-unanalyzable image blocks is referred to a sea background-unanalyzable image block set Sn. In practice, the aforementioned proportionality factor r1 may be 50%, or 75% depending on the requirement of accuracy. After all the image blocks in the set Sn are subduced, the rest image blocks of all the partitioned image blocks constitute a sea background-analyzable image block set Sa. In the present disclosure, methods hereinafter all are carried out with respect to the sea background-analyzable image block set Sa.

In S2, the step of classification, all of the image blocks within the set of image blocks available for analyzing sea image are further classified into two subsets including a subset of image blocks of clear seawater and a subset of image blocks of non-clear seawater.

In the present embodiment, each image block of the sea background-analyzable image block set Sa is further coarse classified into two subsets, i.e. a subset of image blocks of clear seawater Sw and a subset of image blocks of non-clear seawater So.

In the present embodiment, in step S2, the image blocks within the sea background-analyzable image block set Sa may be images of clear seawater, or may be image blocks containing targets such as vessels or the like. In the present disclosure, since the crated sea background is a statistical model in frequency domain, if the target contained in the image block occupies a large area, the accuracy of sea background modeling will be affected; instead, if the target occupies a small area, the accuracy of sea background modeling will not be significantly affected. In the present disclosure, the target occupying a small area means that the occupied area of the target within the image block is less than the 1% of the total area of the image block. There are several known techniques to carry out coarse classification for the image blocks within the set Sa into image blocks of clear seawater and of non-clear seawater, for example, the classification method based on histogram non-single peaked detection, etc. Such method can separate the image blocks containing large target out from the sea background-analyzable image block set Sa. These image blocks containing large target constitute the subset of image blocks of non-clear seawater So, and the rest image blocks in the set Sa subtracting So constitute the subset of image blocks of clear sea water Sw. The classification would not be further introduced herein.

It is to be noted that it is possible that some image blocks of non-clear seawater containing small targets exist in the aforementioned subset of image blocks of clear seawater Sw. Said image blocks of clear seawater thereof generally comprises: image blocks containing partial land or island, image blocks containing large target to be detected, and image blocks containing partial thick cloud region, etc.

In the following steps, it's assumed that the sea background-analyzable image block set Sa as well as the two subsets (the subset of image blocks of clear seawater and the subset of image blocks of non-clear seawater) thereof are obtained.

In S3, the step of calculation, each image block within the set of sea background-analyzable image blocks is converted by 2D distribution Fourier transform to obtain the respective frequency spectrogram, and the corresponding amplitude spectrogram is obtained by calculating the frequency spectrogram.

In the present embodiment, each image block $f_k$ within the image block set Sa is converted by 2D Fourier transform to obtain a respective frequency spectrogram $F_k$ corresponding to the image block, and then the corresponding amplitude spectrogram $A_k$ is obtained by calculating the frequency spectrogram.

Assuming that the size of each image block within the image block set Sa is N×N, wherein the $k^{th}$ image block is $f_k(x, y)$, and $(x, y)$ is a position in the pixel spatial coordinates of the image, $0 \leq x \leq N-1$, $0 \leq y \leq N-1$. Then its frequency spectrogram $F_k(u, v)$, $0 \leq u \leq N-1$, $0 \leq v \leq N-1$, converted by 2D discrete spatial Fourier transform may be calculated using the following equation (1):

$$F_k(u, v) = \frac{1}{N} \sum_{u=0}^{N-1} \sum_{v=0}^{N-1} f_k(x, y) e^{-j \frac{2\pi}{N}(ux+vy)} \quad (1)$$

The corresponding amplitude spectrogram $A_k(u, v)$ is calculated using the equation (2):

$$A_k(u, v) = |F_k(u, v)| = \sqrt{R_k^2(u,v) + I_k^2(u,v)} \quad (2)$$

wherein, $R_k(u, v)$ is a graph constituted of the real part of $F_k(u, v)$, and, $I_k(u, v)$ is a graph constituted of the imaginary part of $F_k(u, v)$.

In S4, the step of modeling, an image block to be analyzed is determined in the sea background-analyzable image block set, and all the image blocks of clear seawater surrounding the image block to be analyzed are found out from the subset of image blocks of clear seawater, as the image block to be analyzed being center; a graph of Gaussian probability model for the amplitude spectrogram of sea background is therefore constructed based on the located image blocks of clear water.

In the present embodiment, an image block $f_i$ to be analyzed is determined from the image block set Sa. As the image block $f_i$ being center, a subset $Sw_i$ is constituted by finding out all the image blocks of clear seawater neighboring $f_i$ from the subset of image blocks of clear water Sw. The graph of Gaussian probability model for the amplitude spectrogram of sea background $G_i$ is therefore constructed using the image blocks within the $Sw_i$.

Assuming that the image block to be analyzed in the image block set Sa are $f_i(x, y)$, having a size of M×N, a frequency spectrogram converted by 2D discrete spatial Fourier transform is $F_i(u, v)$, and an amplitude spectrogram is $A_i(u, v)$, $0 \leq u \leq N-1$, $0 \leq v \leq N-1$.

Figure 2A:
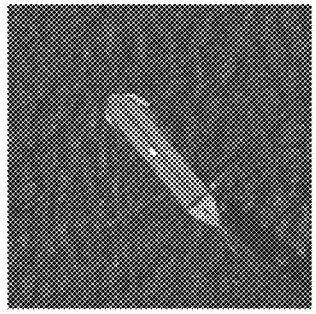
FIG. 2A is an illustrative diagram of one image block to be analyzed according to one embodiment of the present disclosure.
Figure 2B:
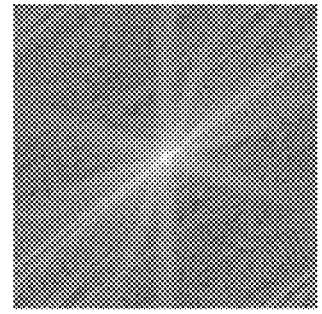
FIG. 2B is an amplitude spectrogram corresponding to the FIG. 2A according to one embodiment of the present disclosure.

FIG. 2A is an example of one image block to be analyzed according to one embodiment of the present disclosure, with FIG. 2B being its corresponding amplitude spectrogram.

As the image block $f_i$ being center, a subset $Sw_i$ is constituted by finding out all the image blocks of clear seawater neighboring $f_i$ from the subset of image blocks of clear water Sw. Said "neighboring" means a rectangular or a circular neighborhood centered around the image block $f_i$. If a side length of the segmented image block is represented by N, the diameter of the neighborhood may be 2N to 5N. In the present disclosure, circular neighborhood is adopted with a diameter of 3N. It's assumed that the number of the image blocks of clear seawater contained in the subset $Sw_i$ is J, wherein $f_j(x, y)$ are the $j^{th}$ image blocks of clear sea water, $0 \leq x \leq N-1$, $0 \leq y \leq N-1$, and its frequency spectrogram converted by 2D discrete spatial Fourier transform is $F_j(u, v)$, and therefore the amplitude spectrogram is $A_j(x, y)$, $0 \leq u \leq N-1$, $0 \leq v \leq N-1$.

Furthermore, a graph of Gaussian probability model $G_i$ of the amplitude spectrogram for sea background of sea area at the image block to be analyzed $f_i(x, y)$ is constructed by using all the amplitude spectrograms $A_j(x, y)$ in the subset of image blocks of clear seawater $Sw_i$, and the probability density function of the model can be represented by:

$$p_i(u, v) = \frac{1}{\sqrt{2\pi}\, \sigma_i(u, v)} \exp\left(-\frac{[A_i(u, v) - m_i(u, v)]^2}{2[\sigma_i(u, v)]^2}\right) \quad (3)$$

wherein, $$m_i(u, v) = \frac{1}{J} \sum_{j=1}^{J} A_j(u, v) \quad (4)$$

$$[\sigma_i(u, v)]^2 = \frac{1}{J} \sum_{j=1}^{J} [A_j(u, v) - m_i(u, v)]^2 \quad (5)$$

The $m_i(u, v)$ is the mean chart of the amplitude spectrogram of the image blocks within the subset of image blocks of clear seawater $Sw_i$ neighboring the image block to be analyzed $f_i(x, y)$, and the $[\sigma_i(u, v)]^2$ is the variance chart of the amplitude spectrogram of the image blocks within the subset of image blocks of clear seawater $Sw_i$ neighboring the image block to be analyzed $f_i(x, y)$. The $m_i(u, v)$ and the $[\sigma_i(u, v)]^2$ are known as the graph of Gaussian probability model $G_i$ of the amplitude spectrogram for sea background of the image block to be analyzed $f_i(x, y)$. According to the equation (4) and (5), respective Gaussian distribution statistics model of sea background is created at each frequency point (u, v) of the image blocks, and therefore the mean value and the variance value are $m_i(u, v)$ and $[\sigma_i(u, v)]^2$ respectively.

In S5, the step of suppression, a suppression filter based on the graph of Gaussian probability model of the amplitude spectrogram is constructed, and sea background suppression is performed on the image block to be analyzed.

In the present embodiment, the amplitude spectrogram $A_i$ of the image block $f_i$ and the amplitude spectrogram probability model $G_i$ of sea background are used to construct a suppression filter $B_i$ of sea background, wherein the $B_i$ is used to perform background suppression for the images.

Figure 3:
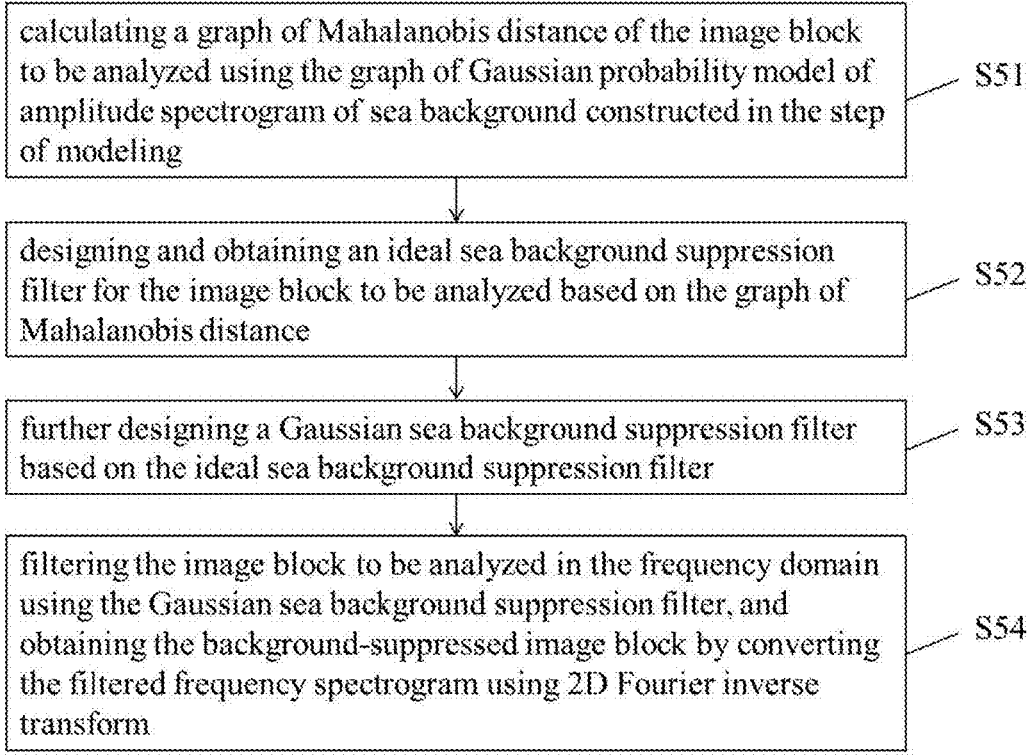
FIG. 3 is a detailed flow diagram of the suppression step shown in FIG. 1 according to one embodiment of the present disclosure.

Specifically, as shown in FIG. 3, the step S5 further comprises:

in step S51, a graph of Mahalanobis distance of the image block to be analyzed is calculated using the graph of Gaussian probability model of amplitude spectrogram of sea background constructed in the step of modeling;

In the present embodiment, the graph of Mahalanobis distance of the image block to be analyzed $f_i$ is calculated using the background probability model $G_i$ of the image block $f_i$ in S4.

Equation (6) is used to compute the graph of Mahalanobis distance $Q(u,v)$:

$$Q(u, v) = \frac{[A_i(u, v) - m_i(u, v)]^2}{[\sigma_i(u, v)]^2} \tag{6}$$

In step S52, an ideal sea background suppression filter for the image block to be analyzed is designed and obtained based on the graph of Mahalanobis distance.

In the present embodiment, the ideal sea background suppression filter $\Omega_i(u, v)$ for the image block to be analyzed $f_i$ is designed and obtained based on the graph of Mahalanobis distance $Q(u, v)$ calculated in step S52.

In the present embodiment, the ideal sea background suppression filter $\Omega_i(u, v)$ of the image block $f_i$ may be calculated via the equation (7)

$$\Omega_i(u, v) = \begin{cases} 1, & Q(u, v) > T \\ 0, & Q(u, v) \leq T \end{cases} \tag{7}$$

wherein, T is constant known as the estimation threshold. Conventionally, T is a real number within the interval of [1, 9]. In the present embodiment, T=9.

In step S53, the Gaussian sea background suppression filter is further designed using the ideal sea background suppression filter.

In the present embodiment, the Gaussian sea background suppression filter $B_i(u, v)$ is further designed using the designed ideal sea background suppression filter $\Omega_i(u, v)$.

In the present embodiment, the ideal sea background suppression filter $\Omega_i(u, v)$ would cause a "ringing" effect in practical application, affecting the sea background suppression. The present disclosure uses Gaussian kernel function to smooth the ideal sea background suppression filter obtained in step S52, so as to obtain a Gaussian sea background suppression filter $B_i(u, v)$ that may overcome the "ringing" effect. Gaussian sea background suppression filter $B_i(u, v)$ can be expressed as equation (8):

$$B_i(u, v) = \Omega_i(u, v) * H_d(u, v) \tag{8}$$

wherein, in equation (8), the mathematical symbol "*" refers to the two-dimensional convolution operation. $H_d(u, v)$ represents a Gaussian smooth function template centered on (u, v) with a size of (2d+1)×(2d+1), d is limited to any positive integer. In the embodiments of the present disclosure, d=1.

The Gaussian smooth function template $H_d(u, v)$ can be obtained by way of equation (9):

$$H_d(u, v) = \frac{1}{W} e^{-\frac{u^2+v^2}{2\lambda^2}}, -d \leq u \leq d, -d \leq v \leq d \tag{9}$$

wherein, in equation (9), u is an integer selected from $-d \leq u \leq d$, and v is an integer selected from $-d \leq v \leq d$; the parameter $\lambda$ is a constant in relevant to the smooth strength and normally $\lambda=d$. In the embodiments of the present disclosure, $\lambda=1$; W is a normalized constant associated with the smooth function, and can be calculated by the equation (10):

$$W = \sum_{u=-d}^{d} \sum_{v=-d}^{d} e^{-\frac{u^2+v^2}{2\lambda^2}}, -d \leq u \leq d, -d \leq v \leq d \tag{10}$$

In step S54, the image block to be analyzed is filtered in the frequency domain using the Gaussian sea background suppression filter, and the background-suppressed image block is obtained by converting the filtered frequency spectrogram using 2D Fourier inverse transform.

In the present embodiment, the image block to be analyzed $f_i$ is filtered in the frequency domain using the sea background suppression filter $B_i$, and the background-suppressed image block $f_{ti}$ is obtained by converting the filtered frequency spectrogram using 2D Fourier inverse transform.

In the present embodiment, as shown above, $F_i(x, y)$ represents the Fourier frequency spectrogram of the image block to be analyzed $f_i(x, y)$, the Gaussian sea background suppression filter is $B_i(u, v)$, then the background suppression filtering can be expressed as equation (11):

$$F_{ti}(u, v) = F_i(u, v) B_i(u, v) \tag{11}$$

and the 2-dimensional Fourier inverse transform for calculating the background-suppressed image block $f_{ti}(x, y)$ can be expressed as equation (12):

$$f_{ti}(x, y) = \frac{1}{N} \sum_{x=0}^{N-1} \sum_{y=0}^{N-1} F_{ti}(u, v) e^{j\frac{2\pi}{N}(ux+vy)} \tag{12}$$

Figure 4A:
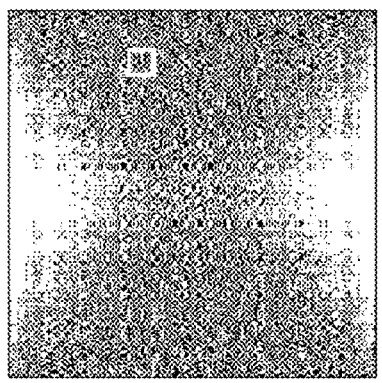
FIG. 4A is an illustrative diagram of an ideal sea background suppression filter according to one embodiment of the present disclosure.
Figure 4B:
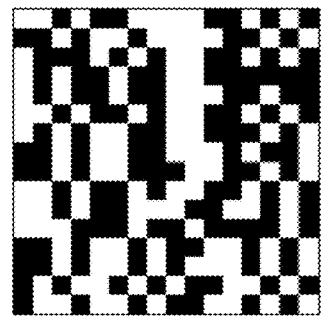
FIG. 4B is an enlarged partial view of FIG. 4A according to one embodiment of the present disclosure.
Figure 4C:
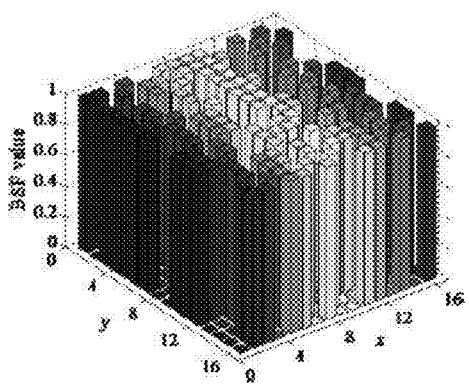
FIG. 4C is a three dimensional diagram of FIG. 4B according to one embodiment of the present disclosure.
Figure 5A:
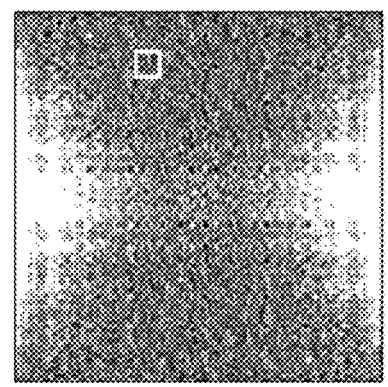
FIG. 5A is an illustrative diagram of a Gaussian sea background suppression filter according to one embodiment of the present disclosure.
Figure 5B:
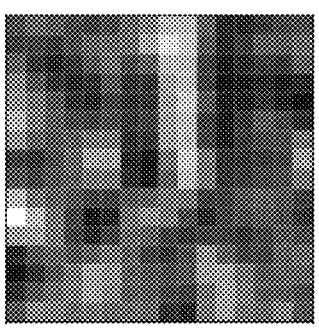
FIG. 5B is an enlarged partial view of FIG. 5A according to one embodiment of the present disclosure.
Figure 5C:
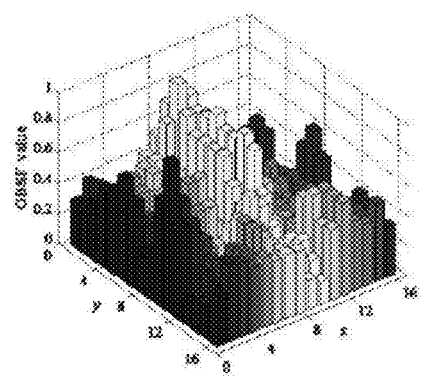
FIG. 5C is a three dimensional diagram of FIG. 5B according to one embodiment of the present disclosure.
Figure 6:
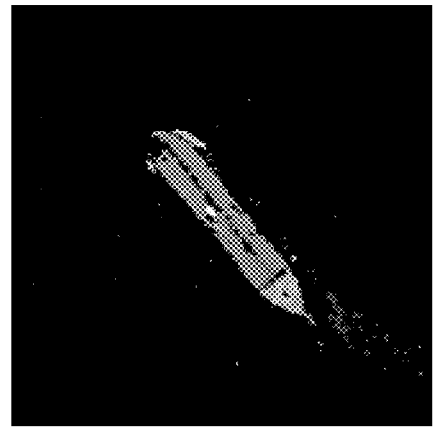
FIG. 6 schematically illustrates the result of filtering the image block to be analyzed of FIG. 2A using the Gaussian sea background suppression filter of FIG. 5A according to one embodiment of the present disclosure.

FIGS. 4A to 4C, 5A to 5C and 6 illustrate an example of the embodiment of the present disclosure. FIG. 4A illustrates a calculated ideal sea background suppression filter at the sea area of image block of FIG. 2A; FIG. 4B is an enlarged partial view of the white square in FIG. 4A; FIG. 4C is a three-dimensional diagram of FIG. 4B. FIG. 5A illustrates a calculated Gaussian sea background suppression filter at the sea area of image block of FIG. 2A; FIG. 5B is an enlarged partial view of the white square in FIG. 5A; FIG. 5C is a three-dimensional diagram of FIG. 5B. FIG. 6 illustrates the result of conducting background suppression on the image block FIG. 2A by using the filter of FIG. 5A and therefore converting the background-suppressed image block to spatial domain.

In addition, the present disclosure also provides a method for sea background modeling and suppression of high-resolution satellite remote sensing sea images, which further comprises:

circulation: determining a next image block to be analyzed, and repeating the steps of modeling and suppression so as to perform sea background suppression on the new image block to be analyzed until all of the image blocks are done with sea background suppression.

The method for sea background modeling and suppression on high-resolution remote sensing sea images of the present disclosure avoids the instability of the detected result of the targets in the remote sensing sea image resulted from the sea background model of satellite remote sensing sea images adopted by the prior art which cannot describe and suppress the sea background clutter well. The present disclosure uses the method to conduct suppression on the sea background first and then detect the target therein, leading to improvement of detection accuracy and reduction of false alarm.

A system 10 for sea background modeling and suppression on high-resolution remote sensing sea images is also provided in the detailed embodiment of the present disclosure, comprising:

a segmentation module 11, configured to pre-process and divide a remote sensing image into a plurality of image blocks, and carry out coarse classification for the plurality of image blocks to pick out a set of image blocks available for analyzing sea image;

a classification module 12, configured to further classify all of the image blocks within the set of image blocks available for analyzing sea image into two subsets including a subset of image blocks of clear seawater and a subset of image blocks of non-clear seawater;

a calculation module 13, configured to convert each of the image blocks within the set of image blocks available for analyzing sea image, by 2D discrete Fourier transform, into a respective frequency spectrogram, and therefore calculate the frequency spectrogram to obtain a respective amplitude spectrogram;

a modeling module 14, configured to determine one image block to be analyzed from the set of image blocks available for analyzing sea image; locate all the image blocks of clear seawater surrounding the image block to be analyzed from the subset of image blocks of clear seawater, as the image block to be analyzed being center; and construct a graph of Gaussian probability model for the amplitude spectrogram of sea background based on the located image blocks of clear water;

a suppression module 15, configured to construct a suppression filter based on the graph of Gaussian probability model of the amplitude spectrogram, and perform sea background suppression on the image block to be analyzed.

The system 10 for sea background modeling and suppression on high-resolution remote sensing sea images provided in the present disclosure conducts suppression on sea background first and then detects the target, leading to improvement of detection accuracy and reduction of false alarm.

Figure 7:
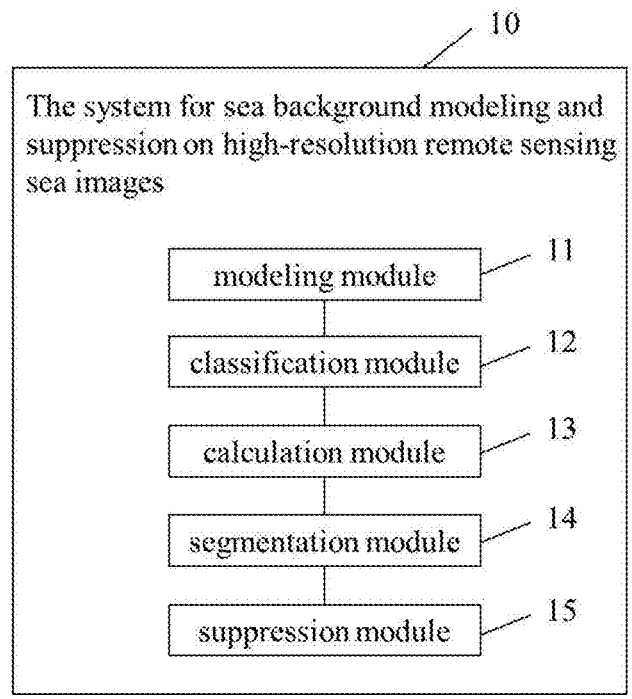
FIG. 7 is structural diagram of a system for sea background modeling and suppression of a high-resolution remote sensing sea image according to one embodiment of the present disclosure.

Referring to FIG. 7, it illustrates a system 10 for sea background modeling and suppression on high-resolution remote sensing sea images according to one embodiment of the present disclosure.

In the present embodiment, the system 10 for sea background modeling and suppression on high-resolution remote sensing sea images mainly comprises a segmentation module 11, a classification module 12, a calculation module 13, a modeling module 14, and a suppression module 15.

The segmentation module 11 is configured to pre-process and divide a remote sensing image into a plurality of image blocks, and carry out coarse classification for the plurality of image blocks to pick out a set of image blocks available for analyzing sea image.

In the present embodiment, the segmentation method of the segmentation module 11 has been specified in the foregoing description in step S1, and the description therefore will not be repeated here.

The classification module 12 is configured to further classify all of the image blocks within the set of image blocks available for analyzing sea image into two subsets including a subset of image blocks of clear seawater and a subset of image blocks of non-clear seawater.

In the present embodiment, the classification method of the classification module 12 has been specified in the foregoing description in step S2, and the description therefore will not be repeated here.

The calculation module 13 is configured to convert each of the image blocks within the set of image blocks available for analyzing sea image, by 2D discrete Fourier transform, into a respective frequency spectrogram, and therefore calculate the frequency spectrogram to obtain a respective amplitude spectrogram.

In the present embodiment, the calculation method of the calculation module 13 has been specified in the foregoing description in step S3, and the description therefore will not be repeated here.

The modeling module 14 is configured to determine one image block to be analyzed from the set of image blocks available for analyzing sea image; locate all the image blocks of clear seawater surrounding the image block to be analyzed from the subset of image blocks of clear seawater, as the image block to be analyzed being center; and construct a graph of Gaussian probability model for the amplitude spectrogram of sea background based on the located image blocks of clear water.

In the present embodiment, the modeling method of the modeling module 14 has been specified in the foregoing description in step S4, and the description therefore will not be repeated here.

The suppression module 15 is configured to construct a suppression filter based on the graph of Gaussian probability model of the amplitude spectrogram, and perform sea background suppression on the image block to be analyzed.

In the present embodiment, the suppression 15 is specifically configured to:

calculate a graph of Mahalanobis distance of the image block to be analyzed by using the graph of Gaussian probability model of amplitude spectrogram of sea background constructed in the step of modeling;

design and obtain the ideal sea background suppression filter for the image block to be analyzed based on the graph of Mahalanobis distance;

further design the Gaussian sea background suppression filter based on the ideal sea background suppression filter;

filter the image block to be analyzed in the frequency domain using the Gaussian sea background suppression filter, and obtain the background-suppressed image block by converting the filtered frequency spectrogram using 2D Fourier inverse transform.

In the present embodiment, the suppression method of the suppression module 15 has been specified in the foregoing description in step S5, and the description therefore will not be repeated here.

In addition, the system 10 for sea background modeling and suppression on high-resolution remote sensing sea images provide by the present disclosure further comprises:

a circulation module, configured to determine a next image block to be analyzed, and repeat the steps of modeling and suppression so as to perform sea background suppression on the new image block to be analyzed until all of the image blocks are done with sea background suppression.

The system 10 for sea background modeling and suppression on high-resolution remote sensing sea images of the present disclosure avoids the instability of the detected result of the targets in the remote sensing sea image resulted from the sea background model of satellite remote sensing sea images adopted by the prior art which cannot describe and suppress the sea background clutter well. The present disclosure uses the method to conduct suppression on the sea background first and then detect the target therein, leading to improvement of detection accuracy and reduction of false alarm.

It is to be noted that every unit described in the foregoing embodiments is merely divided according to its logical functions, but is not limited to the aforementioned division, as long as corresponding function can be implemented; besides, the specific names of the functional units are intended to distinguish them from each other, rather than to limit the protection scope of the present disclosure.

Additionally, as can readily be appreciated by one of ordinary skill in the art that all or part of the steps of the aforementioned embodiments may be implemented by hardware executed by algorithms. The algorithms may be stored in a computer readable storage medium including, for example ROM/RAM, disc, or light disk, etc.

The foregoing description are merely intend to illustrate preferred embodiments of the present disclosure, but not to limit the scope of the present disclosure. Any modification, equivalent replacement or improvement made without departing from the spirit and principle of the present invention should fall within the scope of the present disclosure.

What is claimed is:

1. A method for sea background modeling and suppression on high-resolution remote sensing sea images, comprising:
   segmentation: pre-processing and dividing a remote sensing image into a plurality of image blocks, and carrying out coarse classification for the plurality of image blocks to pick out a set of image blocks available for analyzing sea image;
   classification: further classifying all of the image blocks within the set of image blocks available for analyzing sea image into two subsets including a subset of image blocks of clear seawater and a subset of image blocks of non-clear seawater;
   calculation: converting each of the image blocks within the set of image blocks available for analyzing sea image, by 2D discrete Fourier transform, into a respective frequency spectrogram, and therefore calculating the frequency spectrogram to obtain a respective amplitude spectrogram;
   modeling: determining one image block to be analyzed from the set of image blocks available for analyzing sea image; locating all the image blocks of clear seawater surrounding the image block to be analyzed from the subset of image blocks of clear seawater, as the image block to be analyzed being center; and constructing a graph of Gaussian probability model for the amplitude spectrogram of sea background based on the located image blocks of clear water;
   suppression: constructing a suppression filter based on the graph of Gaussian probability model of the amplitude spectrogram, and performing sea background suppression on the image block to be analyzed.

2. The method for sea background modeling and suppression on high-resolution remote sensing sea images according to claim 1, further comprising:
   circulation: determining a next image block to be analyzed, and repeating the steps of modeling and suppression so as to perform sea background suppression on the new image block to be analyzed until all of the image blocks are done with sea background suppression.

3. The method for sea background modeling and suppression on high-resolution remote sensing sea images according to claim 1, wherein the step of suppression comprises:
   calculating a graph of Mahalanobis distance of the image block to be analyzed using the graph of Gaussian probability model of amplitude spectrogram of sea background constructed in the step of modeling;
   designing and obtaining an ideal sea background suppression filter for the image block to be analyzed based on the graph of Mahalanobis distance;
   further designing a Gaussian sea background suppression filter based on the ideal sea background suppression filter;
   filtering the image block to be analyzed in the frequency domain using the Gaussian sea background suppression filter, and obtaining the background-suppressed image block by converting the filtered frequency spectrogram using 2D Fourier inverse transform.

4. A system for sea background modeling and suppression on high-resolution remote sensing sea images, comprising:
   a segmentation module, configured to pre-process and divide a remote sensing image into a plurality of image blocks, and carry out coarse classification for the plurality of image blocks to pick out a set of image blocks available for analyzing sea image;
   a classification module, configured to further classify all of the image blocks within the set of image blocks available for analyzing sea image into two subsets including a subset of image blocks of clear seawater and a subset of image blocks of non-clear seawater;
   a calculation module, configured to convert each of the image blocks within the set of image blocks available for analyzing sea image, by 2D discrete Fourier transform, into a respective frequency spectrogram, and therefore calculate the frequency spectrogram to obtain a respective amplitude spectrogram;
   a modeling module, configured to determine one image block to be analyzed from the set of image blocks available for analyzing sea image; locate all the image blocks of clear seawater surrounding the image block to be analyzed from the subset of image blocks of clear seawater, as the image block to be analyzed being center; and construct a graph of Gaussian probability model for the amplitude spectrogram of sea background based on the located image blocks of clear water;
   a suppression module, configured to constructs a suppression filter based on the graph of Gaussian probability model of the amplitude spectrogram, and perform sea background suppression on the image block to be analyzed.

5. The system for sea background modeling and suppression on high-resolution remote sensing sea images according to claim 4, further comprising:

a circulation module, configured to determine a next image block to be analyzed, and repeat the steps of modeling and suppression so as to perform sea background suppression on the new image block to be analyzed until all of the image blocks are done with sea background suppression.

6. The system of claim 4, wherein the suppression module is further configured to:
calculate a graph of Mahalanobis distance of the image block to be analyzed using the graph of Gaussian probability model of amplitude spectrogram of sea background constructed in the step of modeling;
design and obtain an ideal sea background suppression filter for the image block to be analyzed based on the graph of Mahalanobis distance;
further design an Gaussian sea background suppression filter based on the ideal sea background suppression filter;
filter the image block to be analyzed in the frequency domain using the Gaussian sea background suppression filter, and obtain the background-suppressed image block by converting the filtered frequency spectrogram via 2D Fourier inverse transform.

* * * * *